(12) United States Patent
Shiraishi (10) Patent No.: US 10,654,400 B2
(45) Date of Patent: May 19, 2020

(54) LIGHTING DEVICE FOR VEHICLES AND LIGHTING TOOL FOR VEHICLES

(71) Applicant: Toshiba Lighting & Technology Corporation, Yokosuka-shi, Kanagawa-ken (JP)

(72) Inventor: Hiromitsu Shiraishi, Yokosuka (JP)

(73) Assignee: Toshiba Lighting & Technology Corporation, Yokosuka-shi, Kanagawa-ken (JP)

(*) Notice: Subject to any disclaimer, the term of this patent is extended or adjusted under 35 U.S.C. 154(b) by 57 days.

(21) Appl. No.: 15/908,069

(22) Filed: Feb. 28, 2018

(65) Prior Publication Data

US 2019/0054850 A1 Feb. 21, 2019

(30) Foreign Application Priority Data

Aug. 18, 2017 (JP) .................................. 2017-157822

(51) Int. Cl.
*B60Q 1/00* (2006.01)
*F21S 45/50* (2018.01)
*F21S 43/19* (2018.01)
*F21S 43/31* (2018.01)
*F21S 45/48* (2018.01)
*F21S 41/19* (2018.01)
*F21S 43/20* (2018.01)

(52) U.S. Cl.
CPC .......... *B60Q 1/0088* (2013.01); *F21S 41/192* (2018.01); *F21S 43/195* (2018.01); *F21S 43/26* (2018.01); *F21S 43/31* (2018.01); *F21S 45/48* (2018.01); *F21S 45/50* (2018.01)

(58) Field of Classification Search
CPC ...... B60Q 1/0088; F21S 45/50; F21S 41/192; F21S 43/31; F21S 43/195; F21S 43/26; F21S 43/48
See application file for complete search history.

(56) References Cited

U.S. PATENT DOCUMENTS

| | | | |
|---|---|---|---|
| 7,703,951 B2 * | 4/2010 | Piepgras | F21K 9/00 362/373 |
| 8,678,632 B2 * | 3/2014 | Gallai | F21V 19/001 362/548 |
| 10,023,108 B2 * | 7/2018 | Kaneko | B60Q 1/2696 |
| 10,317,064 B2 * | 6/2019 | Ozawa | F21V 23/06 |

(Continued)

FOREIGN PATENT DOCUMENTS

| | | |
|---|---|---|
| DE | 10 2014 115941 A1 | 5/2015 |
| EP | 3037715 A1 | 6/2016 |

(Continued)

OTHER PUBLICATIONS

Dec. 6, 2018—(EP) Extended EP Search Report—App 18158664.5, Eng Tran.

*Primary Examiner* — Anabel Ton
(74) *Attorney, Agent, or Firm* — Banner & Witcoff, Ltd.

(57) ABSTRACT

A lighting device for vehicles includes a socket including a flange, and a mounting unit which is provided on one face of the flange; a light emitting unit which is provided at an end portion of the mounting unit on a side opposite to a side of the flange, and includes a light emitting element; and at least one support unit which protrudes from a face of the flange on which the mounting unit is provided.

20 Claims, 6 Drawing Sheets

(56) References Cited

U.S. PATENT DOCUMENTS

| | | | |
|---|---|---|---|
| 2008/0117647 A1* | 5/2008 | Behr | F21V 29/004 |
| | | | 362/547 |
| 2012/0049733 A1* | 3/2012 | Gallai | F21V 19/001 |
| | | | 315/32 |
| 2015/0124470 A1 | 5/2015 | Calderas et al. | |
| 2016/0091165 A1 | 3/2016 | Saito | |
| 2016/0185281 A1 | 6/2016 | Kaneko et al. | |
| 2017/0023201 A1 | 1/2017 | Hino et al. | |
| 2018/0073714 A1 | 3/2018 | Ozawa et al. | |

FOREIGN PATENT DOCUMENTS

| | | |
|---|---|---|
| EP | 3121511 A1 | 1/2017 |
| JP | 2014-120446 A | 6/2014 |
| WO | 2016/158423 A1 | 10/2016 |

\* cited by examiner

LIGHTING DEVICE FOR VEHICLES AND LIGHTING TOOL FOR VEHICLES

CROSS-REFERENCE TO RELATED APPLICATIONS

This application is based upon and claims the benefit of priority from Japanese Patent Application No. 2017-157822, filed on Aug. 18, 2017; the entire contents of which are incorporated herein by reference.

FIELD

Embodiments described herein relate generally to a lighting device for vehicles, and a lighting tool for vehicles.

BACKGROUND

There is a lighting device for vehicles provided with a socket, and a light emitting unit including a light emitting diode (LED). The socket is provided with a flange, and a mounting unit provided on one face of the flange. The light emitting unit is provided at an end portion of the mounting unit, and the end portion of the mounting unit is inserted into a housing of a lighting tool for vehicles. In addition, an annular sealing member (gasket) is attached to a side face of the mounting unit. When the lighting device for vehicles is attached to the housing, the sealing member is interposed between the flange and the housing. For this reason, the inside of the housing is sealed with the sealing member. In addition, the flange and the lighting device for vehicles are supported by the sealing member.

Here, when setting an external dimension (sectional dimension) of the mounting unit to be small, it is possible to prevent the mounting unit which is inserted into the housing of the lighting tool for vehicles from standing out, when viewing the lighting device for vehicles from the outside of the lighting tool for vehicles. For this reason, it is possible to improve a design or a quality in appearance of the lighting tool for vehicles.

However, when the external dimension of the mounting unit is set to be small, also an external dimension of the sealing member becomes small. For this reason, a position of the sealing member which supports the flange moves to a center axis side of the lighting device for vehicles. As a result, a change in thickness of the sealing member which is formed of an elastic material has a remarkable influence on an inclination of the flange, and an inclination of the center axis of the lighting device for vehicles.

In this case, when simply using a sealing member with a large external dimension, a large gap occurs between the sealing member and a side face of the mounting unit, and a position of the sealing member is not fixed. When the position of the sealing member is not fixed, an inclination of the center axis of the lighting device for vehicles varies due to the position of the sealing member.

Therefore, it is desirable to develop a technology in which it is possible to suppress an inclination of the center axis of the lighting device for vehicles, even when the external dimension of the mounting unit is set to be small.

DETAILED DESCRIPTION

A lighting device for vehicles according to an embodiment is provided with: a socket including a flange and a mounting unit which is provided at one face of the flange; a light emitting unit which is provided at an end portion of the mounting unit on a side opposite to a side of the flange, and includes a light emitting element; and at least one support unit which protrudes from a face of the flange on which the mounting unit is provided.

Hereinafter, the embodiment will be exemplified with reference to drawings. In addition, in each figure, the same reference numerals are attached to the same constituent elements, and detailed descriptions thereof will be appropriately omitted.

Lighting Device for Vehicles

A lighting device for vehicles 1 according to the embodiment can be provided in a vehicle, a railway vehicle, or the like, for example. As the lighting device for vehicles 1 provided in a vehicle, for example, it is possible to exemplify a device which is used in a front combination light (for example, light in which daytime running lamp (DRL), position lamp, turn signal lamp, and the like, are appropriately combined), a rear combination light (for example, stop lamp, tail lamp, turn signal lamp, back lamp, fog lamp, and the like, are appropriately combined), or the like. However, a use of the lighting device for vehicles 1 is not limited to these.

Figure 1:
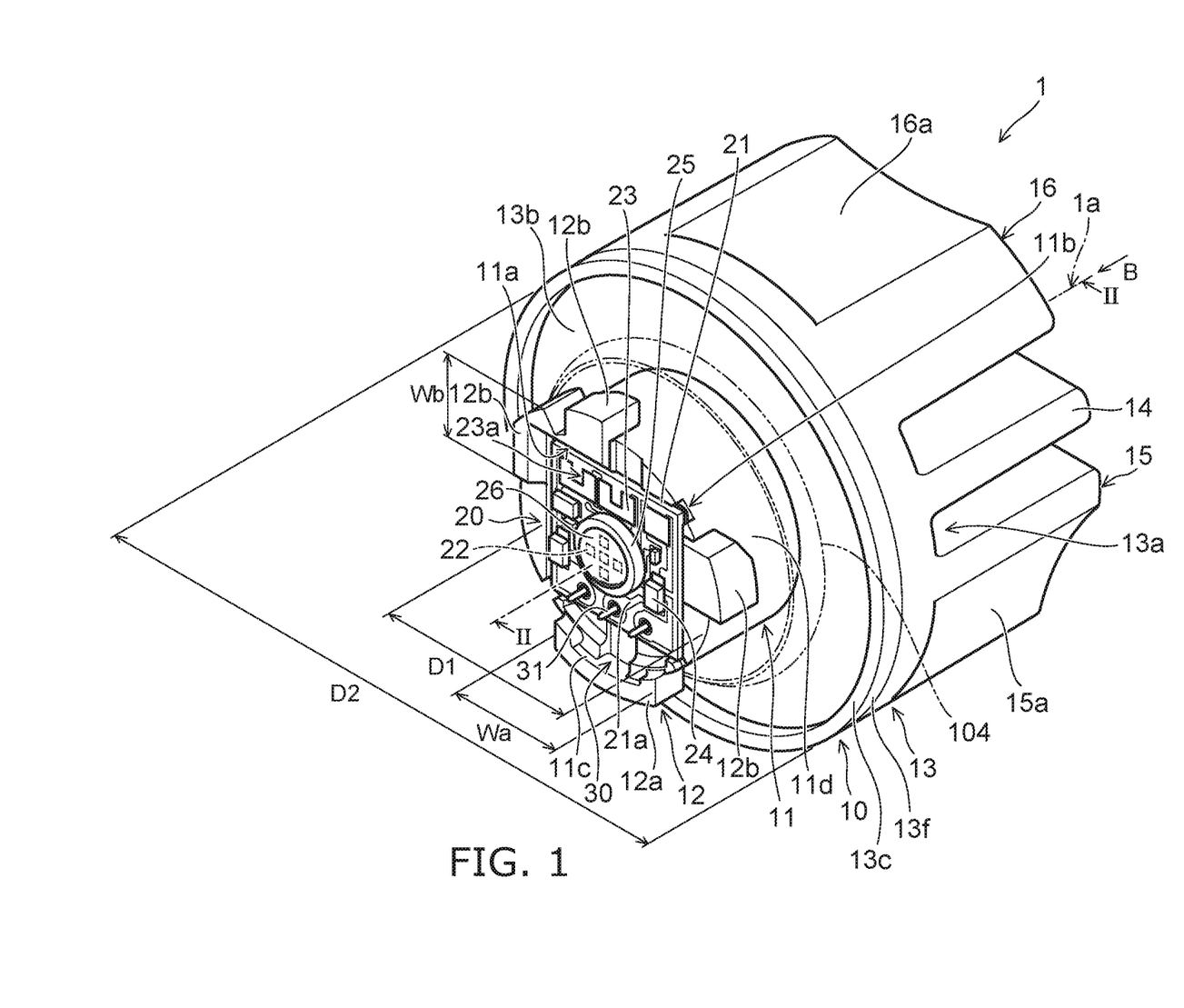
FIG. 1 is a schematic perspective view for exemplifying a lighting device for vehicles according to an embodiment.

FIG. 1 is a schematic perspective view for exemplifying the lighting device for vehicles 1 according to the embodiment.

Figure 2:
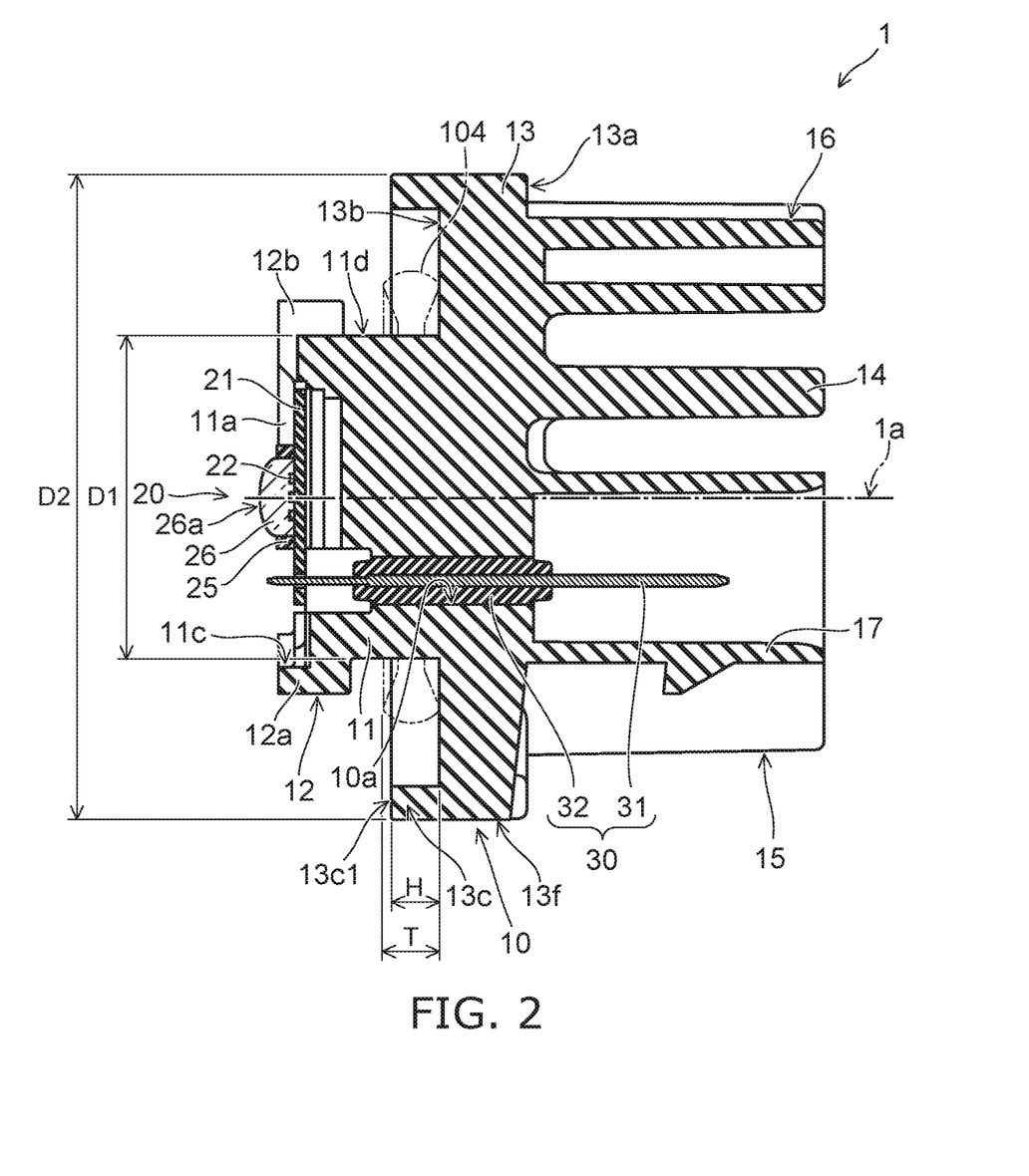
FIG. 2 is a sectional view of the lighting device for vehicles which is taken along line II-II in FIG. 1.

FIG. 2 is a sectional view of the lighting device for vehicles 1 which is taken along line II-II in FIG. 1.

Figure 3:
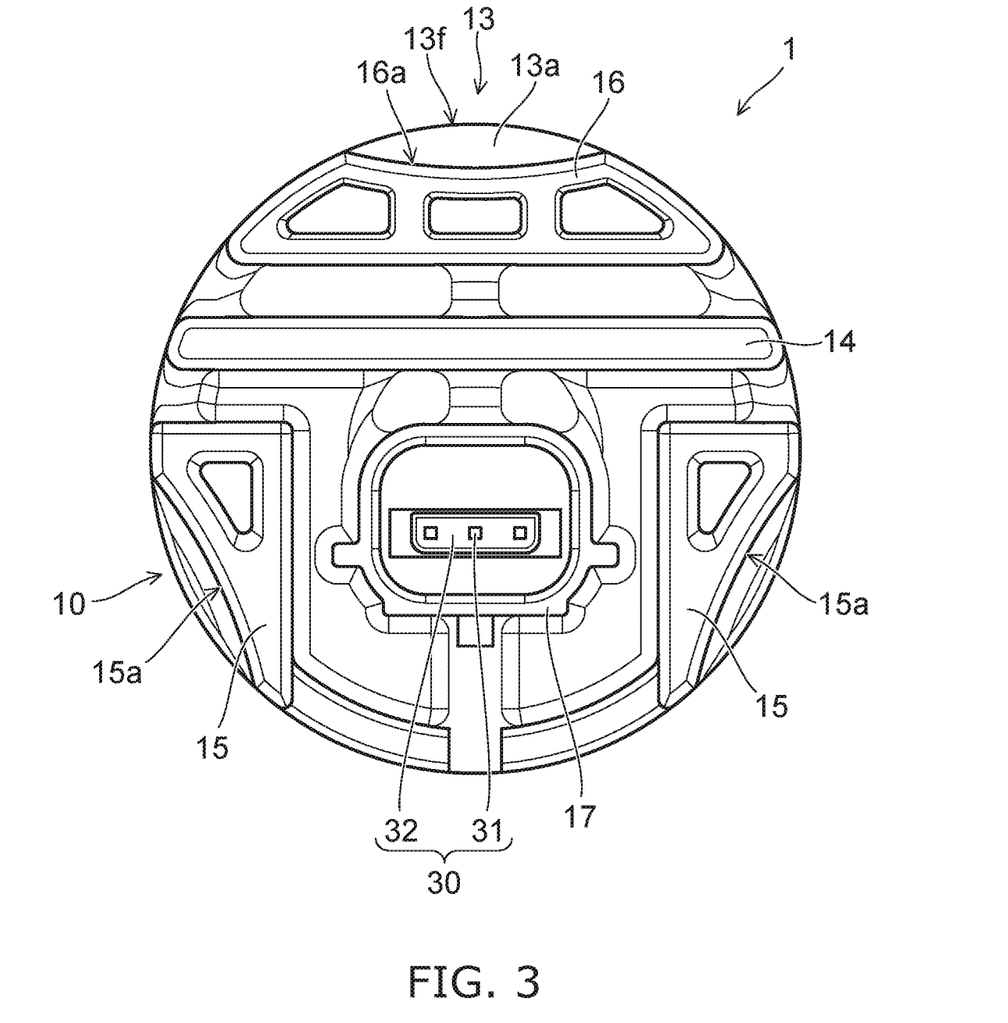
FIG. 3 is a schematic view in which the lighting device for vehicles in FIG. 1 is viewed from a direction of an arrow B.

FIG. 3 is a schematic view which is viewed from a direction of an arrow B of the lighting device for vehicles 1 in FIG. 1.

As illustrated in FIGS. 1 to 3, a lighting device for vehicles 1 is provided with a socket 10, a light emitting unit 20, and a power feeding unit 30.

The socket 10 includes a mounting unit 11, a bayonet 12, a flange 13, a heat radiating fin 14, projection portions 15 and 16, and a terminal cover 17.

The mounting unit 11 is provided on one face of the flange 13. The mounting unit 11 is provided on a face 13b on a side opposite to a side on which the heat radiating fin 14 of the flange 13 is provided. An external shape of the mounting unit 11 can be set to a pillar shape. The external shape of the mounting unit 11 can be set to a cylindrical shape, for example. The mounting unit 11 includes a recessed portion 11a which is opened to an end face on a side opposite to a side of the flange 13. An external dimension (sectional dimension) D1 of the mounting unit 11 can be set to 15 mm or more and 26 mm or less.

In addition, it is possible to provide at least one slit 11b in the mounting unit 11. The slit 11b passes through a portion between a side face (outer side face) 11d of the mounting unit 11 and an inner face (side face of recessed portion 11a) of the mounting unit 11. In addition, one end portion of the slit 11b is open to an end face of the mounting unit 11 on a side opposite to the flange 13 side. A corner portion of a substrate 21 is provided inside the slit 11b. A dimension (width dimension) of the slit 11b in a circumferential direction of the mounting unit 11 is set to be slightly larger than a dimension of the corner portion of the substrate 21. For this reason, it is possible to position the substrate 21 by inserting the corner portion of the substrate 21 into the slit 11b.

In addition, when the slit 11b is provided, it is easy to make the external dimension D1 of the mounting unit 11 small. Alternatively, it is possible to make a planar dimension of the substrate 21 large. For this reason, it is possible to increase the number of elements which is mounted on the substrate 21.

A plurality of the bayonets 12 are provided on the side face 11d of the mounting unit 11. The plurality of bayonets 12 protrude toward the outside of the lighting device for vehicles 1. The plurality of bayonets 12 face the flange 13. The plurality of bayonets 12 are used when attaching the lighting device for vehicles 1 to a housing 101 of the lighting tool for vehicles 100. The plurality of bayonets 12 are used in a twist lock.

In addition, the plurality of bayonets 12 can include a first bayonet 12a and a second bayonet 12b. A width dimension Wa of the first bayonet 12a is longer than a width dimension Wb of the second bayonet 12b. A disposal of the first bayonet 12a is not particularly limited; however, it is preferable to make the first bayonet 12a and a plurality of power feeding terminals 31 face each other. In this manner, it is possible to form a notch portion 11c in the inside of the first bayonet 12a. The notch portion 11c becomes a space into which soldering iron is inserted when soldering the plurality of power feeding terminals 31. A disposal of the second bayonet 12b is not particularly limited. In this case, it is preferable to set the number of second bayonets 12b, or a disposal thereof becomes different according to a use of the lighting device for vehicles 1. In this manner, it is possible to prevent a lighting device for vehicles for another use from being wrongly assembled.

The flange 13 is formed in a plate shape. The flange 13 can be formed in a circular plate shape, for example. A side face 13f of the flange 13 is provided at the outer part of the lighting device for vehicles 1 compared to a side face of the bayonet 12. An external dimension D2 of the flange 13 can be set to 30 mm or more and 40 mm or less.

As illustrated in FIGS. 1 and 2, an annular sealing member 104 (gasket) is attached to the side face 11d of the mounting unit 11. For this reason, a position of the sealing member 104 on a face 13b of the flange 13 becomes constant due to the mounting unit 11.

A support unit 13c is provided on the face 13b of the flange 13.

The support unit 13c will be described in detail later.

The heat radiating fin 14 is provided on a face 13a of the flange 13 which is on a side opposite to a side on which the mounting unit 11 is provided. The heat radiating fin 14 can be formed in a flat plate shape. The number of the heat radiating fins 14 is not particularly limited, and it is possible to provide one or more heat radiating fins 14. The socket 10 exemplified in FIGS. 1 to 3 is provided with one heat radiating fin 14. When providing a plurality of the heat radiating fins 14, it is possible to provide the heat radiating fins 14 so as to be parallel to each other. Also the projection portions 15 and 16, and the terminal cover 17 function as a heat radiating fin. For this reason, the heat radiating fin 14 can be provided as necessary.

The projection portions 15 and 16 can be formed in a block shape. For example, a thickness of the thickest portion of the projection portions 15 and 16 can be set to one and a half times or more of the thickness of the heat radiating fin 14. For this reason, rigidity of the projection portions 15 and 16 becomes larger than rigidity of the heat radiating fin 14. In addition, any one of the projection portions 15 and 16 can be provided with a recessed portion which is open to an end face on a side opposite to the flange 13 side. When the recessed portion is provided, it is possible to obtain light weight, an increase in heat radiating area, a decrease in use amount of a material, or the like, while suppressing a decrease in rigidity.

The projection portions 15 and 16 protrude from the face 13a of the flange 13. The projection portion 15 is provided in the vicinity of the peripheral edge of the flange 13. A plurality of the projection portions 15 can be provided. As illustrated in FIG. 3, two projection portions 15 are provided in the socket 10. The terminal cover 17 is provided between the plurality of projection portions 15. The plurality of projection portions 15 and the terminal cover 17 can be provided in line in a direction intersecting a direction in which the heat radiating fin 14 and the projection portion 16 are aligned. A distance from the face 13a of the flange 13 to an end face of the projection portion 15 can be set to be approximately the same as that from the face 13a of the flange 13 to an end face of the terminal cover 17.

Here, since a connector 105 is mounted on the terminal cover 17, it is difficult to make an external dimension (thickness dimension) of the terminal cover 17 large. For this reason, there is a case in which resistance of the terminal cover 17 to an external force decreases. In the lighting device for vehicles 1 according to the embodiment, the terminal cover 17 is provided at a portion between the plurality of projection portions 15. In addition, the plurality of projection portions 15 are provided in the vicinity of the peripheral edge of the flange 13, and the terminal cover 17 is provided at a center region of the flange 13. For this reason, it is possible to prevent an external force from being added to the terminal cover 17.

The projection portion 16 is provided in the vicinity of the peripheral edge of the flange 13. The projection portion 16 is provided on a side opposite to the plurality of projection portions 15 side by interposing the heat radiating fin 14 therebetween. For this reason, both side face sides of the heat radiating fin 14 is surrounded with the plurality of the projection portions 15 and the projection portion 16. A distance from the face 13a of the flange 13 to an end face of the projection portion 16 can be set to be approximately the same as that from the face 13a of the flange 13 to the end face of the heat radiating fin 14. In addition, respective end faces of the projection portion 15, the projection portion 16, the terminal cover 17, and the heat radiating fin 14 can be provided at the same position.

Here, when setting the thickness of the heat radiating fin 14 to be thin, it is possible to provide the heat radiating fin also in a region which becomes narrow due to a miniaturization of the socket 10. When it is possible to provide the heat radiating fin 14, it is possible to make a heat radiating area large. However, when the thickness of the heat radiating fin 14 becomes thin, resistance of the heat radiating fin 14 to an external force decreases. In the lighting device for vehicles 1 according to the embodiment, the both side face sides of the heat radiating fin 14 are surrounded with the plurality of projection portions 15 and the projection portion 16. For this reason, it is possible to prevent an external force from being added to the heat radiating fin 14.

That is, when the projection portions 15 and 16 are provided, it is possible to prevent a worker from grasping the heat radiating fin 14 and the terminal cover 17 when mounting the lighting device for vehicles 1 on the lighting tool for vehicles 100. For this reason, it is possible to prevent the heat radiating fin 14 and the terminal cover 17 from being damaged. In addition, when providing the projection portions 15 and 16, a worker easily grasps the socket 10 when mounting the lighting device for vehicles 1 on the lighting tool for vehicles 100.

In addition, it is possible to provide a recessed portion 15a on the side face of the projection portion 15. It is possible to provide a recessed portion 16a on a side face of the projection portion 16. The recessed portions 15a and 16a can be set to projection portions with a curved face. Shapes of the recessed portions 15a and 16a can be set so as to fit a person's finger, for example. When the recessed portions 15a and 16a are provided, a worker can grasp the socket 10 more easily, when mounting the lighting device for vehicles 1 on the lighting tool for vehicles 100.

The terminal cover 17 has a function of protecting the end portion of the power feeding terminal 31, and a function of holding the connector 105. The terminal cover 17 is provided on the face 13a of the flange 13. The terminal cover 17 is provided at the center region of the flange 13. The terminal cover 17 can be formed in a rectangular cylindrical shape, for example. An end portion of the power feeding terminal 31 protrudes to the inside of the terminal cover 17. The connector 105 including a sealing member is mounted on the terminal cover 17.

Heat generated in the light emitting unit 20 is mainly transmitted to the heat radiating fin 14, the projection portion 15, the projection portion 16 and the terminal cover 17 through the mounting unit 11 and the flange 13. The heat transmitted to the heat radiating fin 14, or the like, is radiated to the outside. For this reason, it is preferable to form the socket 10 using a material with high conductivity by taking into consideration of transmitting heat generated in the light emitting unit 20 to the outside. The material with high heat conductivity can be set to, for example, metal such as aluminum or an aluminum alloy, or a high heat conductive resin. The high heat conductive resin is a resin, for example, obtained by mixing filler in which an inorganic material is used into a resin such as polyethylene terephthalate (PET) or nylon. The filler can be set to filler which includes ceramic such as aluminum oxide, or carbon. When forming the socket 10 using the high heat conductive resin, it is possible to efficiently radiate heat generated in the light emitting unit 20, and realize light weight.

The mounting unit 11, the bayonet 12, the flange 13, the heat radiating fin 14, the projection portion 15, the projection portion 16, and the terminal cover 17 can be integrally molded by using die casting, injection molding, or the like. When these elements are integrally molded, heat transmission becomes easy, and it is possible to improve a heat radiating property. In addition, it is easy to obtain a reduction in manufacturing cost, a miniaturization, light weight, or the like.

The light emitting unit 20 is provided at an end portion of the mounting unit 11 on a side opposite to the flange 13 side. The light emitting unit 20 is provided inside the recessed portion 11a.

The light emitting unit 20 includes the substrate 21, a light emitting element 22, a resistor 23, a control element 24, a frame portion 25, and a sealing portion 26.

The substrate 21 is formed in a flat plate shape. A planar shape of the substrate 21 can be set to a quadrangle shape, for example. A material or a structure of the substrate 21 is not particularly limited. For example, the substrate 21 can be formed of an inorganic material such as ceramic (for example, aluminum oxide, or aluminum nitride), or an organic material such as paper phenol or glass epoxy. In addition, the substrate 21 may be obtained by covering the surface of a metal plate with an insulating material. When covering the surface of the metal plate with the insulating material, the insulating material may be formed of an organic material, or an inorganic material. When a heat generating amount of the light emitting element 22 is large, it is preferable to form the substrate 21 using a material with high heat conductivity in a viewpoint of heat radiating. As the material with high heat conductivity, for example, ceramic of aluminum oxide, aluminum nitride, or the like, a high heat conductive resin, a material obtained by covering the surface of the metal plate with the insulating material, or the like, can be exemplified. In addition, the substrate 21 may be a single layer or a multilayer.

In addition, a wiring pattern 21a is provided on a face of the substrate 21 on a side opposite to the socket 10 side. The wiring pattern 21a can be formed of a material of which a main component is silver. The wiring pattern 21a can be formed of silver or a silver alloy, for example. However, a material of the wiring pattern 21a is not limited to the material of which the main component is silver. The wiring pattern 21a can be formed of a material of which a main component is copper, for example.

The substrate 21 can be bonded to a lower face of the recessed portion 11a, for example. A type of an adhesive is not particularly limited; however, it is preferable to be an adhesive with high heat conductivity. For example, the adhesive can be set to an adhesive into which filler using an inorganic material is mixed. It is preferable to set the inorganic material to a material with high heat conductivity (for example, ceramic of aluminum oxide, aluminum nitride, or the like). It is possible to set heat conductivity of the adhesive to 0.5 W/(m·K) or more and 10 W/(m·K) or less, for example.

In addition, it is also possible to provide a heat radiating plate between the substrate 21 and the lower face of the recessed portion 11a. The heat radiating plate is formed in a flat plate shape, and can be formed of metal such as aluminum or an aluminum alloy. It is possible to provide a layer formed of heat conductive grease (heat radiating grease), or the above described layer formed of an adhesive between the heat radiating plate and the lower face of the recessed portion 11a. A type of the heat conductive grease is not particularly limited; however, it is possible to set to heat conductive grease in which filler using a material with high heat conductivity (for example, ceramic of aluminum oxide, aluminum nitride, or the like) is mixed into modified silicone, for example. The heat conductivity of the heat conductive grease can be set to, for example, 1 W/(m·K) or more and 5 W/(m·K) or less.

The light emitting element 22 is provided on a face of the substrate 21 on a side opposite to the socket 10 side. The light emitting element 22 is provided on the substrate 21. The light emitting element 22 is electrically connected to the wiring pattern 21a which is provided on the surface of the substrate 21. The light emitting element 22 can be set to a light emitting diode, an organic light emitting diode, a laser diode, or the like, for example. A plurality of the light emitting elements 22 can be provided. The plurality of light emitting elements 22 can be connected in series to each other. In addition, the light emitting element 22 is connected to the resistor 23 in series.

The light emitting element 22 can be set to a chip-shaped light emitting element. The chip-shaped light emitting element 22 can be mounted, using chip on board (COB). When the chip-shaped light emitting element 22 is mounted, using COB, it is possible to provide many light emitting elements 22 in a narrow region. For this reason, it is possible to make the light emitting unit 20 small, and make the lighting device for vehicles 1 small. The light emitting element 22 is electrically connected to the wiring pattern 21a using wiring. The light emitting element 22 and the wiring pattern 21a can be electrically connected, using a wire bonding method. It is also possible to set the light emitting element 22 to a flip-chip light emitting element.

In addition, it is also possible to set the light emitting element 22 to a surface-mounted light emitting element or a shell-type light emitting element including a lead wire.

The resistor 23 is provided on a face of the substrate 21 on a side opposite to the socket 10 side. The resistor 23 is provided on the substrate 21. The resistor 23 is electrically connected to the wiring pattern 21a which is provided on the surface of the substrate 21. The resistor 23 can be set to, for example, a surface-mounted resistor, a resistor including a lead wire (metal oxide film resistor), a film-shaped resistor, or the like, which is formed by a screen printing method, or the like. In addition, the resistor 23 exemplified in FIG. 1 is the film-shaped resistor.

A material of the film-shaped resistor can be set to, for example, ruthenium oxide ($RuO_2$). The film-shaped resistor can be formed by a screen printing method and a baking method, for example. When the resistor 23 is the film-shaped resistor, it is possible to improve a heat radiating property, since it is possible to make a contact area between the resistor 23 and the substrate 21 large. In addition, it is possible to form a plurality of resistors 23 at one time. For this reason, it is possible to improve productivity, and suppress unevenness in resistance value in the plurality of resistors 23.

Here, since there is unevenness in forward voltage characteristics of the light emitting element 22, when setting an application voltage between an anode terminal and a ground terminal to be constant, there is unevenness in brightness of light (light flux, luminance, intensity of light, and illuminance) which is radiated from the light emitting element 22. For this reason, it is set so that a value of current which flows in the light emitting element 22 falls in a predetermined range using the resistor 23, so that a brightness of light radiated from the light emitting element 22 falls in a predetermined range. In this case, it is set so that a value of current which flows in the light emitting element 22 falls in a predetermined range, by changing a resistance value of the resistor 23.

When the resistor 23 is the surface mounting-type resistor or the resistor with a lead wire, a resistor 23 with an appropriate resistance value is selected according to the forward voltage characteristics of the light emitting element 22. When the resistor 23 is the film-shaped resistor, it is possible to increase a resistance value by forming an elimination portion 23a by removing a part of the resistor 23. For example, it is possible to easily remove a part of the resistor 23 by radiating laser light to the resistor 23. The number, a size, an arrangement, and the like, of the resistor 23 are not limited to examples, and can be appropriately changed according to the number, a specification, or the like, of light emitting elements 22.

The control element 24 is provided on a face of the substrate 21 on a side opposite to the socket 10 side. The control element 24 is provided on the substrate 21. The control element 24 is electrically connected to the wiring pattern 21a which is provided on the surface of the substrate 21. The control element 24 is provided so that a backward voltage is not applied to the light emitting element 22, and pulse noise from the backward direction is not applied to the light emitting element 22. The control element 24 can be set to a diode, for example. The control element 24 can be set to, for example, a surface-mounted diode, a diode including a lead wire, or the like. The control element 24 exemplified in FIG. 1 is the surface-mounted diode.

In addition to that, it is also possible to provide a pull-down resistor in order to detect a disconnection, or prevent erroneous lighting, or the like, of the light emitting element 22. In addition, it is also possible to provide a cover portion which covers the wiring pattern 21a, the film-shaped resistor, or the like. The cover portion can include a glass material, for example.

When it is a chip-shaped light emitting element 22, it is possible to provide the frame portion 25 and the sealing portion 26.

The frame portion 25 is provided on a face of the substrate 21 on a side opposite to the socket 10 side. The frame portion 25 is provided on the substrate 21. The frame portion 25 is bonded to the substrate 21. The frame portion 25 surrounds the plurality of light emitting elements 22. For example, the frame portion 25 is formed in an annular shape, and the plurality of light emitting elements 22 are disposed in the inner side. The frame portion 25 can be formed of a resin. The resin can be set to, for example, a thermoplastic resin such as polybutylene terephthalate (PBT), polycarbonate (PC), PET, nylon, polypropylene (PP), polyethylene (PE), and polystyrene (PS).

It is possible to improve reflectivity with respect to light output from the light emitting element 22 by mixing particles of titanium oxide, or the like, into a resin. It is not limited to the particles of titanium oxide, and particles formed of a material with high reflectivity with respect to light output from the light emitting element 22 may be mixed. In addition, the frame portion 25 also can be formed of a white resin, for example.

An inner wall face of the frame portion 25 can be set to an inclined face which inclines in a direction separated from a center axis of the frame portion 25 by being separated from the substrate 21. When the inner wall face of the frame portion 25 is inclined, a part of light output from the light emitting element 22 is reflected on the inner wall face of the frame portion 25, and is output toward the front face side of the lighting device for vehicles 1. That is, the frame portion 25 can have a function of regulating a forming range of the sealing portion 26, and a function of reflector.

The sealing portion 26 is provided inside the frame portion 25. The sealing portion 26 is provided so as to cover the inside of the frame portion 25. That is, the sealing portion 26 is provided inside the frame portion 25, and covers the light emitting element 22, wiring, or the like. The sealing portion 26 is formed of a material with a light-transmitting property. The sealing portion 26 can be formed by filling a resin in the inside of the frame portion 25, for example. Filling of the resin can be performed by a fixed amount discharge device for liquid such as a dispenser, for example. The resin to be filled can be set to a silicone resin, or the like, for example.

A phosphor can be included in the sealing portion 26. The phosphor can be set to a yttrium-aluminum-garnet-based phosphor (YAG phosphor). However, a type of the phosphor can be appropriately changed according to a use, or the like, of the lighting device for vehicles 1 so that it is possible to obtain a desired luminescent color.

An output face 26a of the sealing portion 26 can be set to any one of a protruded curved face (dome-shaped curved face), a recessed curved face, and a planar face. In addition, it is also possible to provide a plurality of uneven portions on the output face 26a. When the output face 26a is a protruded curved face or a recessed curved face, it is possible to control light distribution depending on a shape of the output face 26a. However, since the sealing portion 26 is formed by filling a resin, there is a concern that a shape of the output face 26a may vary. When the shape of the output face 26a varies, light distribution varies. For this reason, when a stability of light distribution is desired, it is preferable to make the output face 26a a planar face.

In addition, it is possible to further provide an optical element such as a lens, or a light guiding body on the output side of light of the sealing portion 26.

It is also possible to provide only the sealing portion 26 without providing the frame portion 25. When only the sealing portion 26 is provided, a dome-shaped sealing portion 26 is provided on the substrate 21.

The power feeding unit 30 includes the power feeding terminal 31 and an insulating portion 32.

The power feeding terminal 31 can be set to a styloid. The power feeding terminal 31 protrudes from the lower face of the recessed portion 11a. A plurality of the power feeding terminals 31 are provided. The plurality of power feeding terminals 31 can be provided in a predetermined direction in a line. The plurality of power feeding terminals 31 are provided inside the insulating portion 32. The plurality of power feeding terminals 31 extend inside the insulating portion 32, and protrude from an end face of the insulating portion 32 on the light emitting unit 20 side, and an end face of the insulating portion 32 on the heat radiating fin 14 side. The end portion of the plurality of power feeding terminals 31 on the light emitting unit 20 side are electrically or mechanically connected to the wiring pattern 21a which is provided on the substrate 21. That is, one end portion of the power feeding terminal 31 is soldered with the wiring pattern 21a. End portions of the plurality of power feeding terminals 31 on the heat radiating fin 14 side are exposed to the inside of the terminal cover 17. The connector 105 is fitted into the plurality of power feeding terminals 31 which are exposed to the inside of the terminal cover 17. The power feeding terminal 31 has conductivity. The power feeding terminal 31 can be formed of metal such as a copper alloy, for example. In addition, the number, a shape, a disposal, a material, or the like, of the power feeding terminal 31 is not limited to the example, and can be appropriately changed.

As described above, it is preferable to form the socket 10 using a material with high heat conductivity. However, there is a case in which a material with high heat conductivity has conductivity. For example, when it is a high heat conductive resin including filler formed of carbon, it has conductivity. For this reason, the insulating portion 32 is provided so as to insulate between the power feeding terminal 31 and the socket 10 with conductivity. In addition, the insulating portion 32 has a function of holding the plurality of power feeding terminals 31. In addition, when the socket 10 is formed of a high heat conductive resin with a property of insulation (for example, high heat conductive resin, or the like, including filler formed of ceramic), it is possible to omit the insulating portion 32. In this case, the socket 10 holds the plurality of power feeding terminals 31.

The insulating portion 32 is provided between the power feeding terminal 31 and the socket 10. The insulating portion 32 has an insulating property. The insulating portion 32 can be formed of an insulating resin. The insulating portion 32 can be formed of PET, nylon, or the like, for example. The insulating portion 32 is provided inside a hole 10a which is provided in the socket 10. The insulating portion 32 can be press-fitted, or bonded to a hole 10a, for example.

In a case of the lighting device for vehicles 1 provided in a vehicle, a temperature of a use environment becomes −40° C. to 85° C. For this reason, it is preferable to set a thermal expansion coefficient of a material of the insulating portion 32 to be closer to a thermal expansion coefficient of a material of the socket 10 if possible. In this manner, it is possible to reduce a thermal stress which is generated between the insulating portion 32 and the socket 10. For example, a material of the insulating portion 32 can be set to a high heat conductive resin included in the socket 10, or a resin included in the high heat conductive resin.

Subsequently, the support unit 13c will be further described.

In the lighting device for vehicles 1 provided in a vehicle, it is desirable to make the external dimension D1 of the mounting unit 11 small. For example, as will be described later, the mounting unit 11 in which the light emitting unit 20 is provided at the end portion is attached to the inside of the lighting tool for vehicles 100 in a state of being exposed. When making the external dimension D1 of the mounting unit 11 small, it is possible to prevent the mounting unit 11 from standing out when the lighting device for vehicles 1 is viewed from the outside of the lighting tool for vehicles 100. For this reason, it is possible to improve a design or a quality in appearance of the lighting tool for vehicles 100.

As will be described later, when attaching the lighting device for vehicles 1 to the housing 101, the sealing member 104 is interposed between the flange 13 and the housing 101. For this reason, the inside of the housing 101 is sealed with the sealing member 104. In addition, the flange 13 and the lighting device for vehicles 1 are supported by the sealing member 104. For this reason, an inclination of the flange 13 and an inclination of the center axis 1a of the lighting device for vehicles 1 are suppressed by the sealing member 104.

However, the smaller the external dimension D1 of the mounting unit 11, the smaller the external dimension of the sealing member 104. When the external dimension of the sealing member 104 becomes small, a contact position of the sealing member 104 with the flange 13 and the housing 101 moves to the center axis 1a side of the lighting device for vehicles 1. That is, a position of the sealing member 104 for supporting the flange 13 moves to the center axis 1a side of the lighting device for vehicles 1. For this reason, a change in thickness of the sealing member 104 which is formed of an elastic material has a remarkable influence on the inclination of the flange 13 and the inclination of the center axis 1a of the lighting device for vehicles 1.

In this case, when the sealing member 104 with a large external dimension is simply used, a large gap occurs between the sealing member 104 and the side face 11d of the mounting unit 11, and a position of the sealing member 104 is not fixed. When the position of the sealing member 104 is not fixed, the inclination of the center axis 1a of the lighting device for vehicles 1 varies due to the position of the sealing member 104.

Therefore, the socket 10 according to the embodiment includes the support unit 13c which is provided on the face 13b of the flange 13.

As illustrated in FIGS. 1 and 2, the support unit 13c protrudes from the face 13b of the flange 13. A distance H from the face 13b of the flange 13 to an apex portion 13c1 of the support unit 13c is shorter than a thickness dimension T of the sealing member 104 which is attached to the face 13b of the flange 13. When attaching the lighting device for vehicles 1 to the housing 101, the sealing member 104 is elastically deformed, and a thickness thereof becomes thin. At this time, at least a part of the apex portion 13c1 of the support unit 13c comes into contact with the housing 101. For this reason, the distance H can be appropriately set by taking into consideration of an amount of elastic deformation of the sealing member 104.

The support unit 13c is provided on a side of the side face 13f of the flange 13 compared to a center portion between the side face 13f of the flange 13 and the side face 11d of the mounting unit 11. In this manner, it is possible to easily suppress an inclination of the flange 13. For this reason, it is possible to easily suppress the inclination of the center axis 1a of the lighting device for vehicles 1. In this case, as illustrated in FIGS. 1 and 2, it is preferable to provide the support unit 13c along the side face 13f of the flange 13.

As illustrated in FIGS. 1 and 2, the support unit 13c can be formed in an annular shape. In addition, the plurality of support units 13c also can be provided by being separated from each other. When providing the plurality of support units 13c, it is possible to provide the support unit at even intervals or predetermined intervals. The number of the support units 13c is not particularly limited; however, it is possible to make a posture of the lighting device for vehicles 1 stable when three or more support units 13c are provided.

Figure 4A:
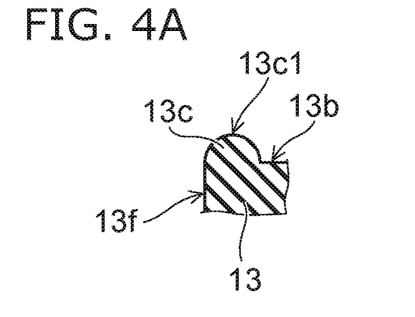
FIGS. 4A to 4C are schematic sectional views for exemplifying a sectional form of a support unit.
Figure 4B:
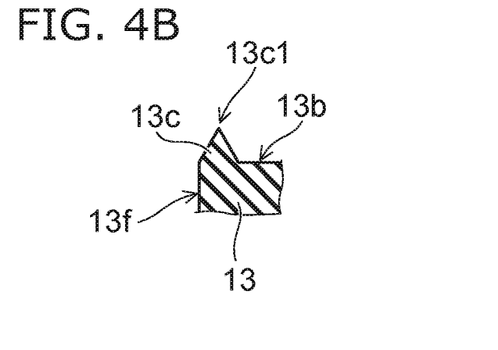
Figure 4C:
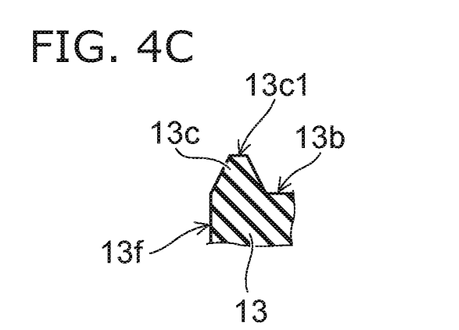

FIGS. 4A to 4C are schematic sectional views for exemplifying a sectional shape of the support unit 13c.

The sectional shape of the support unit 13c is not particularly limited, and for example, it is possible to set thereof to be a quadrangle as illustrated in FIG. 2. For example, it is also possible to set to a shape including a curved line such as a half circle as illustrated in FIG. 4A, a triangle as illustrated in FIG. 4B, or a trapezoidal shape as illustrated in FIG. 4C. However, the sectional shape of the support unit 13c is not limited to the example.

When the support unit 13c is provided, it is possible to suppress an inclination of the center axis is of the lighting device for vehicles 1, even when the external dimension D1 of the mounting unit 11 is reduced.

In addition, it is possible to provide a deformation portion 13d at an end portion of the support unit 13c on a side opposite to the flange 13 side. Rigidity of the deformation portion 13d is set to be smaller than that of the support unit 13c. When the lighting device for vehicles 1 is attached to the housing 101, the deformation portion 13d is subjected to plastic deformation. Since there is an error in a dimension of the socket 10 including the support unit 13c, a dimension of the housing 101, an assembling accuracy when attaching the lighting device for vehicles 1 to the housing 101, or the like, there is a concern that a contact state between the support unit 13c and the housing 101 may vary. When the deformation portion 13d is provided, it is possible to absorb the error. For this reason, it is possible to make a contact state between the support unit 13c and the housing 101 stable.

FIGS. 5A to 5E are schematic sectional views for exemplifying the deformation portion 13d.

Figure 5A:
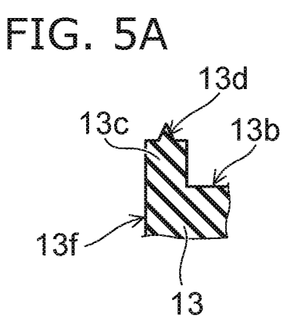
FIGS. 5A to 5E are schematic sectional views for exemplifying a deformation portion.
Figure 5B:
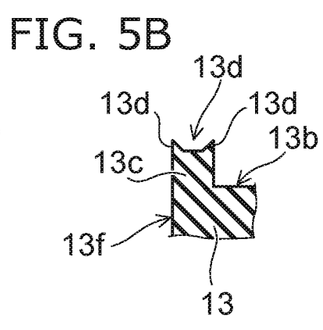
Figure 5C:
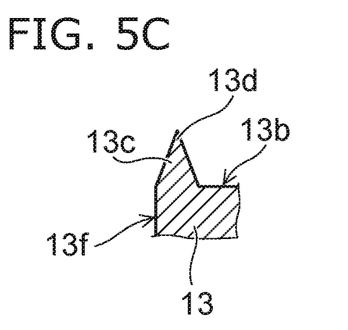
Figure 5D:
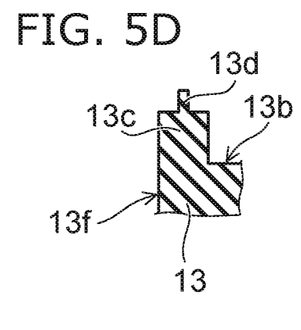
Figure 5E:
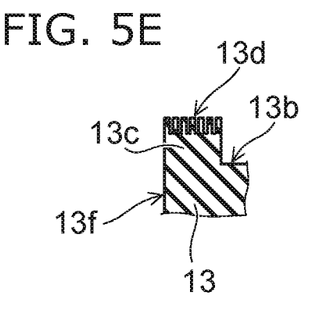

As illustrated in FIG. 5A, the deformation portion 13d can be set to a protrusion which is provided at an end face of the support unit 13c. As illustrated in FIG. 5B, the deformation portion 13d can be set to a plurality of protrusions which are provided at the end face of the support unit 13c, or a recessed portion. As illustrated in FIG. 5C, the deformation portion 13d can be set to a tip end of the support unit 13c of which a sectional shape is a triangle. As illustrated in FIG. 5D, the deformation portion 13d can be set to a portion in which a sectional dimension of a tip end of the support unit 13c is set to be small. As illustrated in FIG. 5E, the deformation portion 13d can be set to a plurality of slits which are provided at the end face of the support unit 13c.

In addition, the number, a dimension, and a sectional shape of the deformation portion 13d can be appropriately changed according to a material of the deformation portion 13d, and a stress, or the like, which is generated when the lighting device for vehicles 1 is attached to the housing 101.

Figure 6A:
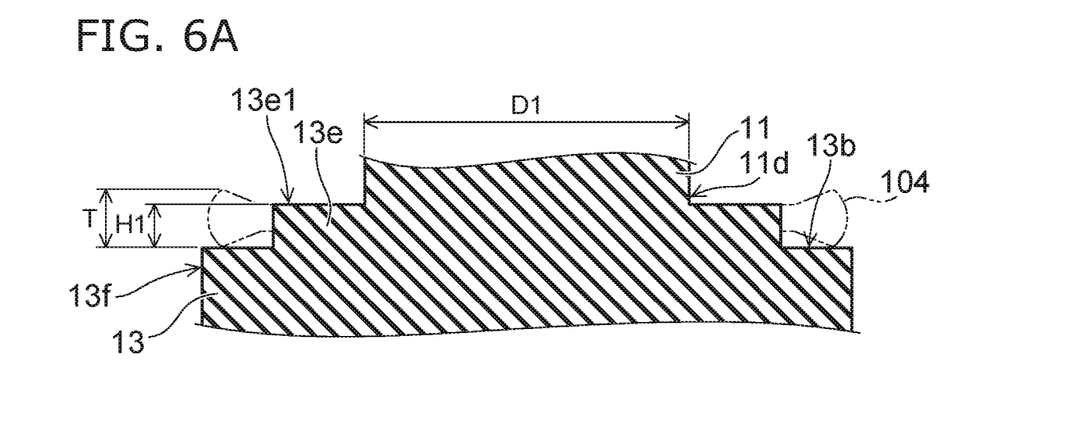
FIGS. 6A and 6B are schematic sectional views for exemplifying a positioning portion.
Figure 6B:
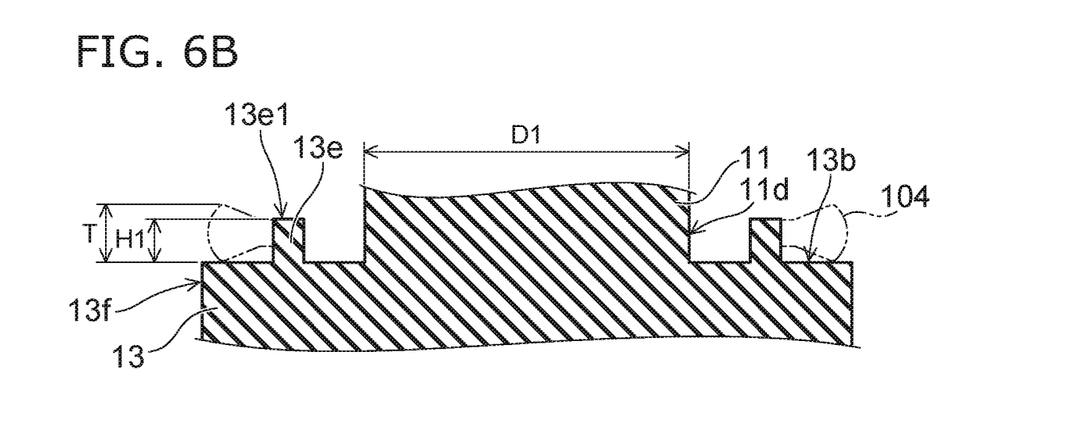

FIGS. 6A and 6B are schematic sectional views for exemplifying a positioning portion 13e.

As illustrated in FIGS. 6A and 6B, the positioning portion 13e is provided on the face 13b of the flange 13. The positioning portion 13e protrudes from the face 13b of the flange 13. The positioning portion 13e is provided on the same axis as that of the mounting unit 11. The inside of the sealing member 104 comes into contact with a side face of the positioning portion 13e. For this reason, it is possible to provide the sealing member 104 at a position where the sealing member 104 is coaxial with the mounting unit 11 due to the positioning portion 13e, even when the external dimension D1 of the mounting unit 11 is set to be small, and the sealing member 104 with a large external dimension is used. For this reason, it is possible to suppress an inclination of the center axis 1a of the lighting device for vehicles 1, even when the external dimension D1 of the mounting unit 11 is set to be small.

A distance H1 from the face 13b of the flange 13 to an apex portion 13e1 of the positioning portion 13e is shorter than the thickness dimension T of the sealing member 104 which is attached to the face 13b of the flange 13. When the lighting device for vehicles 1 is attached to the housing 101, the sealing member 104 is elastically deformed, and the thickness becomes thin. At this time an apex portion 13e1 of the positioning portion 13e may come into contact with the housing 101, and may not come into contact therewith.

The positioning portion 13e can be formed in an annular shape. As illustrated in FIG. 6A, the positioning portion 13e may be integrated with the mounting unit 11, or the positioning portion 13e and the mounting unit 11 may be separated as illustrated in FIG. 6B.

Lighting Tool for Vehicles

Subsequently, the lighting tool for vehicles 100 will be exemplified.

Hereinafter, as an example, a case in which the lighting tool for vehicles 100 is a rear combination light which is provided in a vehicle will be described. However, the lighting tool for vehicles 100 is not limited to the rear combination light which is provided in an automobile. The lighting tool for vehicles 100 may be a lighting tool for vehicles which is provided in an automobile, a railway vehicle, or the like.

Figure 7:
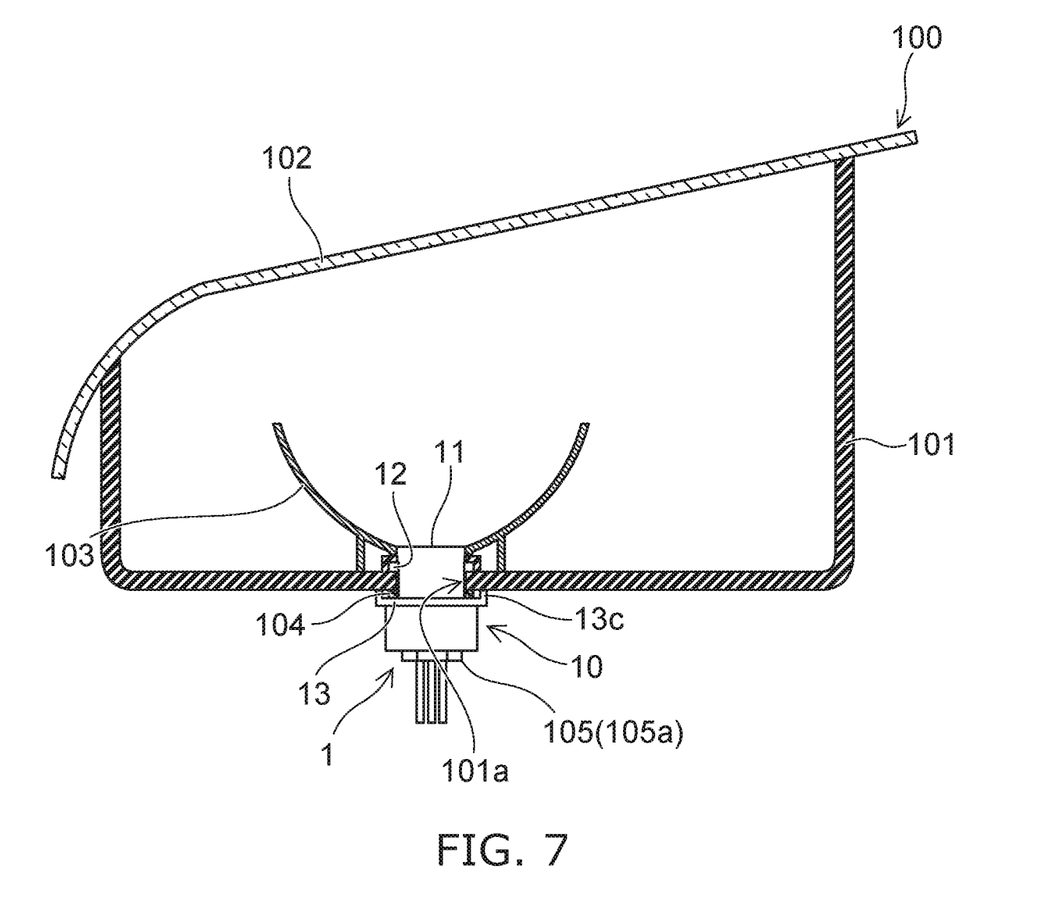
FIG. 7 is a schematic and partial sectional view for exemplifying a lighting tool for vehicles.

FIG. 7 is a partial sectional view for schematically exemplifying the lighting tool for vehicles 100.

As illustrated in FIG. 7, the lighting tool for vehicles 100 is provided with the lighting device for vehicles 1, the housing 101, a cover 102, an optical element portion 103, the sealing member 104, and the connector 105.

The housing 101 holds the mounting unit 11. The housing 101 is formed in a box shape of which one end portion side is open. The housing 101 can be formed of a resin, or the like, through which light is not transmitted. An attaching hole 101a into which a portion at which the bayonet 12 of the mounting unit 11 is provided is inserted is provided on a lower face of the housing 101. A recessed portion into which the bayonet 12 provided in the mounting unit 11 is inserted is provided at the peripheral edge of the attaching hole 101a. In addition, a case in which the attaching hole 101a is directly provided in the housing 101 is exemplified; however, an attaching member including the attaching hole 101a may be provided in the housing 101.

When attaching the lighting device for vehicles 1 to the lighting tool for vehicles 100, the portion in which the bayonet 12 of the mounting unit 11 is provided is inserted into the attaching hole 101a, and the lighting device for vehicles 1 is rotated. Then, the bayonet 12 is held in a joint portion provided at the peripheral edge of the attaching hole 101a. Such an attaching method is referred to as twist-lock.

In addition, when attaching the lighting device for vehicles 1 to the lighting tool for vehicles 100, at least a part of the apex portion 13c1 of the support unit 13c comes into contact with the housing 101. For this reason, even in a case in which the external dimension D1 of the mounting unit 11 is small, it is possible to suppress the inclination of the center axis 1a of the lighting device for vehicles 1. In addition, when the deformation portion 13d is provided, since it is possible to absorb a dimension error or an assembling error, a contact state between the support unit 13c and the housing 101 can be stabilized.

When the positioning portion 13e is provided, it is possible to provide a large sealing member 104 at a position where the sealing member is coaxial with the mounting unit 11. For this reason, even when the external dimension D1 of the mounting unit 11 is set to be small, it is possible to suppress the inclination of the center axis 1a of the lighting device for vehicles 1.

The cover 102 is provided so as to shut off the opening of the housing 101. The cover 102 can be formed of a light-transmitting resin, or the like. It is also possible to set the cover 102 so as to have a function of a lens, or the like.

Light output from the lighting device for vehicles 1 is input to the optical element portion 103. The optical element portion 103 performs reflection, diffusion, light guiding, condensing, a formation of a predetermined light distributing pattern, or the like, of light output from the lighting device for vehicles 1. For example, the optical element portion 103 exemplified in FIG. 7 is a reflector. In this case, the optical element portion 103 reflects light output from the lighting device for vehicles 1, and forms a predetermined light distributing pattern.

The sealing member 104 is provided between the flange 13 and the housing 101. The sealing member 104 can be formed in an annular shape. The sealing member 104 can be formed of an elastic material such as rubber or a silicone resin.

When attaching the lighting device for vehicles 1 to the lighting tool for vehicles 100, the sealing member 104 is interposed between the flange 13 and the housing 101. For this reason, an inner space of the housing 101 is enclosed by the sealing member 104. In addition, the bayonet 12 is pushed to the housing 101 due to an elastic force of the sealing member 104. For this reason, it is possible to prevent the lighting device for vehicles 1 from escaping from the housing 101.

The connector 105 is fitted to end portions of the plurality of power feeding terminals 31 which are exposed to the inside of the terminal cover 17. A power supply (not illustrated), or the like, is electrically connected to the connector 105. For this reason, the power supply (not illustrated), or the like, and the light emitting element 22 are electrically connected when the connector 105 is fitted to the end portion of the power feeding terminal 31. In addition, the connector 105 has a stepped portion. In addition, a sealing member 105a is attached to the stepped portion. The sealing member 105a is provided in order to prevent water from entering the inside of the terminal cover 17. When the connector 105 including the sealing member 105a is inserted into the terminal cover 17, the inside of the terminal cover 17 is enclosed so as to be watertight. The sealing member 105a can be formed in an annular shape. The sealing member 105a can be formed of a material with elasticity such as rubber, a silicone resin, or the like. It is also possible to bond the connector 105 to the terminal cover 17, or the like, using an adhesive, or the like, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A lighting device for a vehicle comprising:
    a socket including a plate-like flange, and a mounting unit which is provided on a surface of the flange;
    a light emitting unit which is provided at an apex portion of the mounting unit on a side of the mounting unit opposite to the flange, and includes a light emitting element; and
    at least one support unit which protrudes from the surface of the flange on which the mounting unit is provided, and the at least one support unit being formed integrally with the flange.

2. The device according to claim 1, wherein the support unit is provided on a side of a side face of the flange compared to a center portion between the side face of the flange and a side face of the mounting unit.

3. The device according to claim 1, wherein the support unit is formed in an annular shape.

4. The device according to claim 1, wherein the at least one support unit includes a plurality of support units provided separated from each other.

5. The device according to claim 1, wherein a distance from the surface of the flange on which the mounting unit is provided to an apex portion of the support unit is shorter than a thickness dimension of a sealing member which is attached to the surface of the flange on which the mounting unit is provided.

6. The device according to claim 1, further comprising:
    a deformation portion which is provided at an end portion of the support unit on a side of the support unit opposite to the flange, and has rigidity which is smaller than rigidity of the support unit.

7. The device according to claim 6, wherein, when the lighting device is attached to a housing of a lighting tool for the vehicle, at least a part of the end portion of the support unit on the side of the support unit opposite to the flange comes into contact with the housing.

8. The device according to claim 1, wherein the support unit is provided along a side face of the flange.

9. The device according to claim 4, wherein the plurality of support units are provided at even intervals.

10. The device according to claim 4, wherein three or more of the support units are provided.

11. The device according to claim 1, wherein a sectional shape of the support unit in a direction orthogonal to the center axis of the lighting device is any one of a triangle, a quadrangle, and a trapezoid.

12. The device according to claim 1, wherein a sectional shape of the support unit in a direction orthogonal to the center axis of the lighting device is a shape including a curved line.

13. The device according to claim 6, wherein, when the lighting device is attached to a housing of a lighting tool for the vehicle, the deformation portion is subjected to plastic deformation.

14. The device according to claim 6, wherein the deformation portion is at least one protrusion which is provided at an end face of the support unit on a side of the support unit opposite to the flange.

15. The device according to claim 6, wherein the deformation portion is a recessed portion which is provided at an end face of the support unit on a side of the support unit opposite to the flange.

16. The device according to claim 6, wherein a sectional shape of the deformation portion in a direction orthogonal to the center axis of the lighting device is a triangle or a quadrangle.

17. The device according to claim 1,
wherein the at least one of the support unit and the socket include a high heat conductive resin.

18. A lighting device for a vehicle, the lighting device comprising:
a socket including a plate-like flange, and a mounting unit which is provided on a surface of the flange;
a light emitting unit which is provided at an apex portion of the mounting unit on a side of the mounting unit opposite to the flange, and includes a light emitting element; and
a positioning portion which protrudes from the surface of the flange on which the mounting unit is provided, and the positioning portion being formed integrally with the flange and provided coaxially with the mounting unit.

19. The device according to claim 18, wherein a distance from the surface of the flange on which the mounting unit is provided to an apex portion of the positioning portion is shorter than a thickness dimension of a sealing member which is attached to the surface of the flange on which the mounting unit is provided.

20. A lighting tool for vehicles comprising:
the lighting device, for the vehicle, according to claim 1;
a housing in which the lighting device is provided; and
a sealing member which is provided between a flange of a socket which is provided in the lighting device and the housing.

* * * * *